United States Patent [19]

Légaré

[11] Patent Number: 4,779,433

[45] Date of Patent: Oct. 25, 1988

[54] DEVICE FOR LOCKING PARKING BRAKE RELEASE VALVE

[76] Inventor: Gilles M. Légaré, 9285, Vincent-Quiblier, Montreal, Qc, Canada, H2M 2B9

[21] Appl. No.: 56,670

[22] Filed: Jun. 2, 1987

[51] Int. Cl.⁴ .............................................. F16B 41/00
[52] U.S. Cl. ......................................... 70/211; 70/231; 70/177
[58] Field of Search ................. 70/175, 176, 177, 178, 70/179, 211, 14, 231, 232, 229, 230

[56] References Cited

U.S. PATENT DOCUMENTS

| 1,625,901 | 4/1927 | Lay | 70/231 |
| 3,707,860 | 1/1973 | Singer | 70/232 |
| 4,226,103 | 10/1980 | Strickland | 70/237 |
| 4,325,237 | 4/1982 | Memzie | 70/14 |

Primary Examiner—Robert L. Wolfe
Attorney, Agent, or Firm—Roland L. Morneau

[57] ABSTRACT

A locking device for parking brakes of trucks using an internally grooved knob on the instrument panel to control air brakes. A sleeve covers the knob and is locked to the knob to prevent pushing on the knob and removing it from the knob. The sleeve is provided with a lock plug for engaging the groove in the knob.

4 Claims, 3 Drawing Sheets

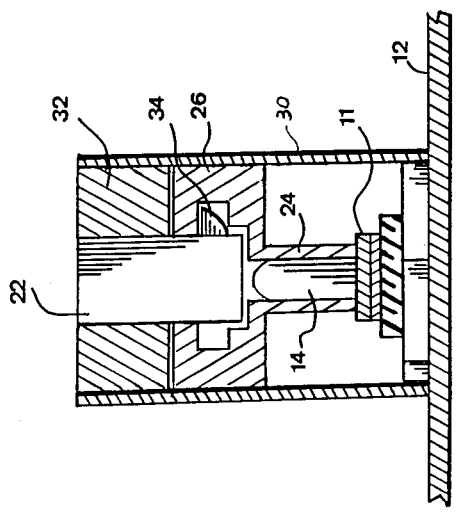
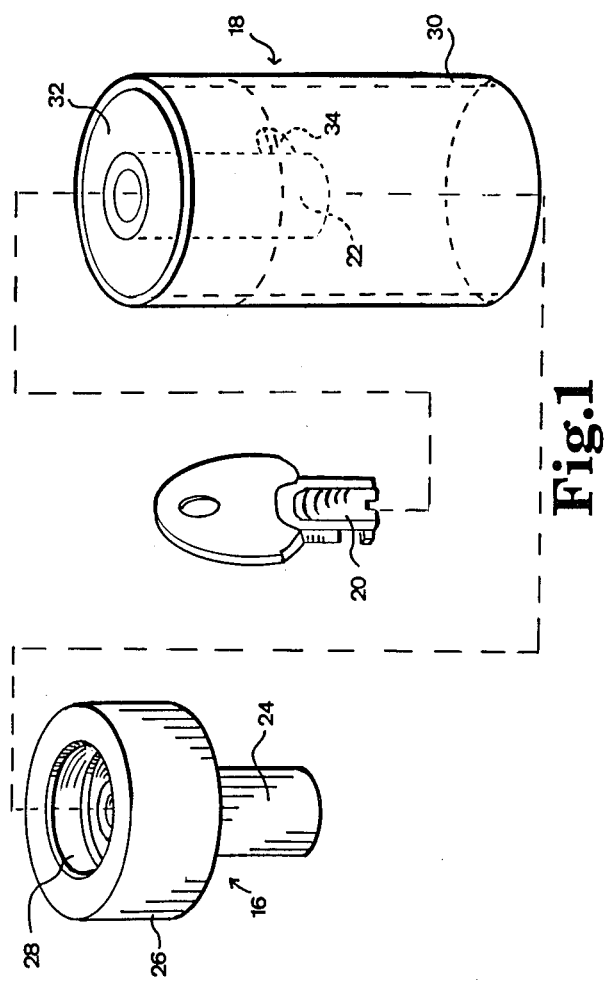
Fig.1
Fig.2

DEVICE FOR LOCKING PARKING BRAKE RELEASE VALVE

BACKGROUND OF THE INVENTION

1. Field of the invention:

The invention is directed to large trucks equipped with air brakes and in particular to the ones having a parking brake valve adapted to be operated with a knob in the driver's cabin. Such valve can control the spring brake of a tractor pulling a trailer and can also, when needed, apply both tractor and trailer parking brakes. The brakes are applied by depressing the knob. The invention consists in locking that knob in the "applied brake" position.

2. Prior art:

No patent appears to correspond to the structure and the purpose of the present invention.

Canadian Pat. No. 1,122,026 discloses a key-operated device including a cylindrical body having a cylindrical recess. A key formed with lugs are adapted to have access to the recess and to rotate a cylindrical member and spindle.

U.S. Pat. Nos. 4,226,103 to Menzie and 4,325,237 to Strickland are directed to locks used on a glad hand brake line coupler. Menzie uses a cylindrical lock with locking fingers but requires no sleeve member around the lock to prevent the depressing of a knob. Stickland uses a lock barrel mechanism extending through a tongue and a tongue receiving recess forming the coupler. The lock barrel has no finger projecting on its periphery and no sleeve to prevent its axial retraction.

BRIEF SUMMARY OF THE INVENTION

Large trucks and especially the tractor pulling a trailer are generally provided with air brakes. Parking brakes are operated with a knob appearing on the instrument panel. The knob actuates a valve fixed behind the panel so that parking brakes are applied by pulling the knob and are released by pushing it. The knob is secured to a stem projecting out of the valve and the stem can be depressed and retracted.

The present invention is directed to a locking device to be fitted on the stem actuating the parking brakes in order to prevent any one from depressing it and accordingly from releasing the brakes. This locking device is used especially for preventing the truck to be stolen while unattended.

A special knob is tightly secured to the stem of the valve. The knob comprises a shank which can be depressed with the stem and a hollow cylindrical casing extending from the shank. The cylindrical casing has an circular recess around the inner surface of the casing. The knob is adapted to be covered by a sleeve member closed at one end. A cylindrical lock plug is axially fitted through said closed end and extends inside the sleeve member with at least one lock finger projecting on the periphery of the plug. The lock finger can be retracted inside the plug by a key actuating the lock plug. The sleeve member has a predetermined length and is stopped by an abutment when it is slipped over the knob. The length of the sleeve member is predetermined so that the lock finger is in line with the recess of the cylindrical casing when it is in its abutted position. When the lock finger is inserted into the recess, the sleeve cannot be retracted from the knob. The predetermined length of the sleeve is also set so that when it is abutted, it cannot depress the knob and therefore cannot release the brakes. When the brakes need to be released, the key is used on the lock plug to retract the lock finger from the recess and remove the sleeve from the knob. The sleeve is made of steele and cannot be easily tampered with.

BRIEF DESCRIPTION OF THE DRAWING

FIG. 1 is a perspective diagram of the locking device of the present invention including a key, a sleeve and a knob to be secured to a retractable stem projecting from a parking brake valve, FIG. 2 is a cross-sectional view of the knob and the sleeve in a locked position on the parking brake valve.

DETAILED DESCRIPTION OF THE INVENTION

Figure 3:
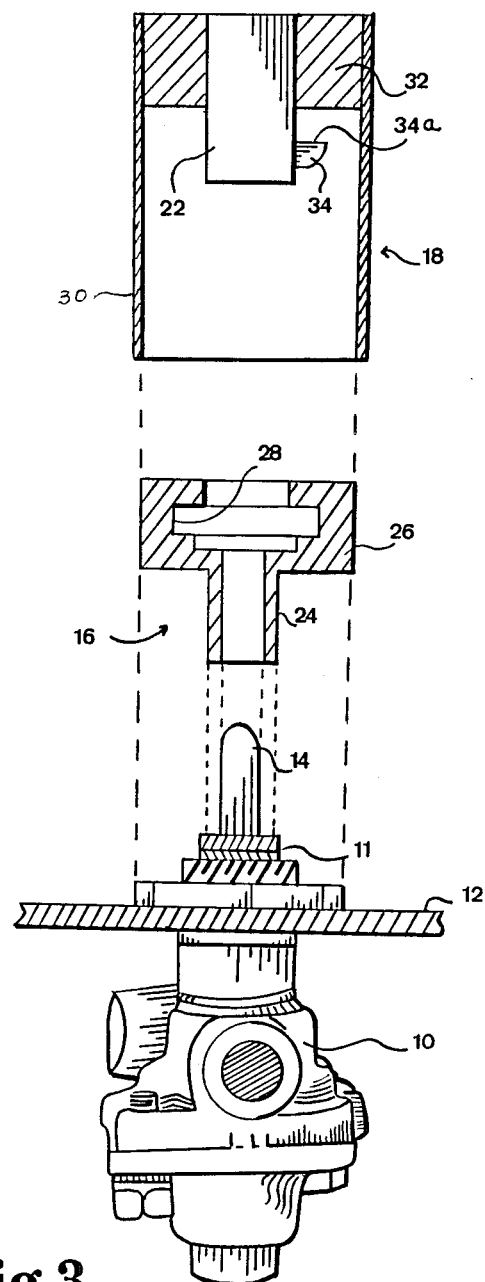
FIG. 3 is an exploded view of the sleeve and the knob shown in cross-section and of the valve shown sideways in perspective.

This invention is directed to the locking of parking brakes when the latter are operated by a knob of any design on the instrument panel in the cabin of the driver. A parking brake valve 10 such as shown in FIG. 3 is secured behind the panel 12. A stem 14 projects out of the valve 10 and can be partly pushed in or pulled out of the valve 10. The brakes are released when it is pushed in and applied when it is pulled out. The locking device, according to the invention, prevents intruders from releasing the brakes by making it impossible to push on the stem 14.

The locking device comprises a knob 16, a sleeve 18 and a key 20. The knob 16 is rigidly secured to the stem 14. The sleeve 18 is intented to be slipped over the knob 16 and pushed until it abuts against an abutting panel 12. The panel 12 is used as an element in a fixed relationship relative to the valve. The key 20 is used to unlock the lock plug 22 and allow the sleeve 18 to be slipped away from the plug 16. The lock plug 22 is shown in perspective in FIGS. 2 and 3 and may be a pin tumbler lock such as the Chicago ACE 7 sold by Chicago Lock Company.

As it may seen from FIGS. 1, 2 and 3, the plug 16 comprises a hollow shank 24 and a hollow cylindrical casing 26. The inner diameter of the shank 24 provides a tight fit with the stem 14 so that it cannot practically be removed from it. The casing 26 is hollow and has a circular recess 28 around its inner surface. The sleeve 18 comprises a cylindrical member 30 closed at one end by a ridgid plate 32. A lock knob 22 is axially sealed into the casing 32 and is provided with a retractable lock finger 34 which can be actuated by the key 20.

Figure 4:
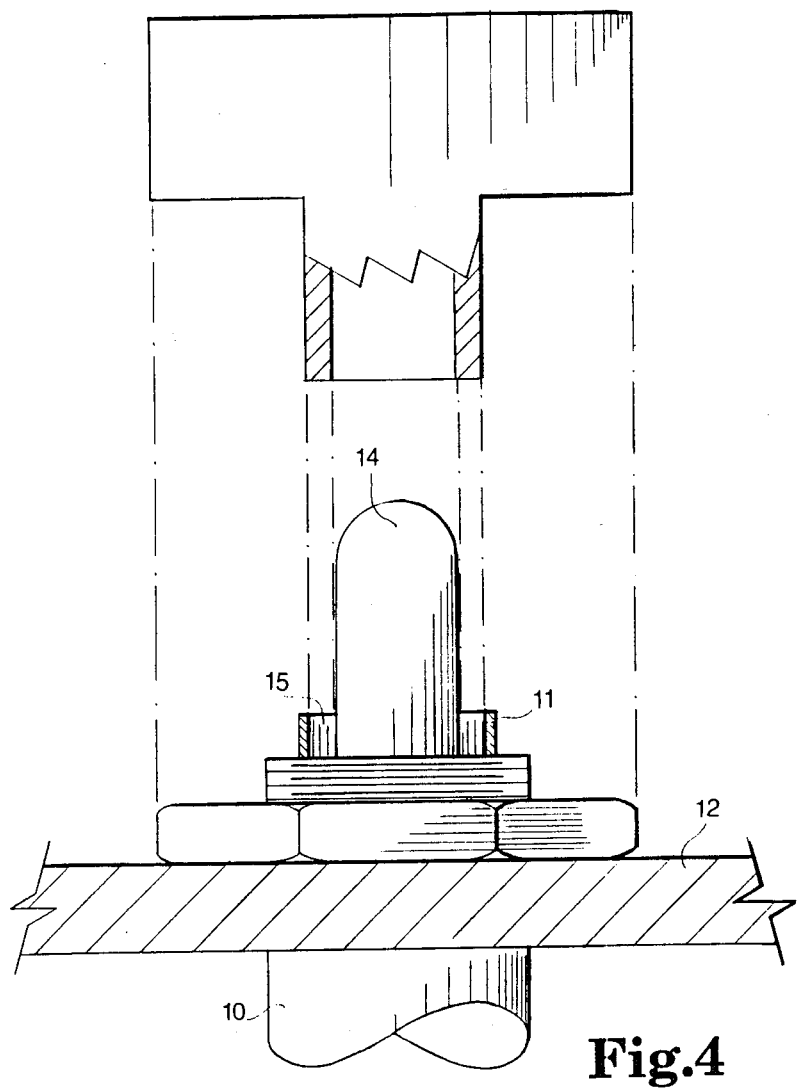
FIG. 4 is a cross-sectional view of the stem portion of the valve shown in FIG. 3.

In operation, the plug 16 is permanently fitted on the stem 14. The shank 24 of the knob 16 moves with the stem 14 and has an outer diameter which allows it to slide partly in the opening or sleeve-like recess 15 inside the ring 11 of the valve 10 as shown in FIG. 4.

When the brakes are applied, the stem 14 and the shank 24 are not depressed inside the ring 11. The sleeve 18 is then slipped over the casing 26. The length of the sleeve 18 is of a predetermined length so that when it comes into abutment against the panel 12, the lock finger 34 reaches the level of the circular recess 28. The lock finger 34 has a flat upper surface 34a which locks into the recess 28 and prevents the sleeve 18 from being retracted. In addition, the sleeve 18 with its predetermined length abutting against the panel 12 cannot be pushed any further. This condition prevent any intruder from releasing the brakes. The panel 12 is herewith identified as the abutting surface but a bracket fixed to the valve could serve the same purpose.

Although, the casing 26 and the sleeve 18 have been described has being cylindrical, it should be obvious that the contour can be polygonal as long as they correspond in shape. In such a case, the lock finger needs to be projecting towards one of the faces of the polygone.

Such variety of contour can be extended to the shank 24 and the stem 14. However, the cylindrical shape is preferred because the sleeve 18 can be slipped over the casing 26 in any radial direction. The lock plug 22 can have more than one lock finger 34 without departing from the invention.

The sleeve 18 is preferable made of solid steel to resist to the force which may be exerted by intruders. The contour of the open end of the sleeve 18 being applied against the abutting surface 12 offers a great resistance to any one trying to tamper with the locking device.

The present locking device is adaptable on a large variety of trucks and tractors and in particular to the ones provided with a retractable stem 14. The plug 16 may be secured to the stem 14 by press-fitting as stated above but may also be threadedly connected to the stem on some vehicles or retained by a cross-pin passing through both the plug 16 and the stem 14.

I claim:

1. A locking device adapted to be mounted on a stem depressingly projecting from a parking brake release valve mounted on a truck cab panel, the said locking device comprising a knob having a shank adapted to be rigidly secured to said stem and to retract with said stem, a hollow tubular casing extending from said shank, said casing being provided with a recess around its inner surface, a sleeve member of a predetermined length adapted to fit over said casing, a plate for closing one end of said sleeve member, a lock plug extending through said plate and into said sleeve member, a retractable lock finger projecting on the periphery of said lock plug and inside said sleeve member, said finger being adapted to extend into the said recess when said sleeve member is mounted over said knob and pushed against an abutment located in a fixed relationship relative to said valve, the position of said abutment being determined by the said predetermined length of said sleeve member, a key adapted to operate said lock plug and to retract said finger, whereby said lock finger, while in said recess, prevent said sleeve from being pulled away from said knob and said sleeve member when applied against said abutment prevent said stem from being depressed into said valve.

2. A locking device as recited in claim 1, wherein the said tubular casing and said sleeve are cylindrical shape.

3. A locking device as recited in claim 1, wherein the sleeve is made of a rigid material.

4. A locking device adapted to be mounted on a stem depressingly projecting in a tubular opening from a parking brake release valve mounted on a truck cab panel, the said valve providing a sleeve-like recess around the said stem, the said locking device comprising a knob having a shank adapted to be rigidly secured to said stem and to retract with said stem and to penetrate partly into said sleeve-like recess, a hollow tubular casing extending from said shank, said casing being provided with a peripheral recess around its inner surface, a sleeve member of a predetermined length adapted to fit over said casing, a plate for closing one end of said sleeve member, a lock plug extending through said plate and into said sleeve member, a retractable lock finger projecting on the periphery of said lock plug and inside said sleeve member, said finger being adapted to extend into the said peripheral recess when said sleeve member is mounted over said knob and pushed against an abutment located in a fixed relationship relative to said valve, the position of said abutment being determined by the said predetermined length of said sleeve member, a key adapted to operate said lock plug and to retract said finger, whereby said lock finger, while in said peripheral recess, prevent said sleeve from being pulled away from said knob and said sleeve member when applied against said abutment and prevent said stem from being depressed into said opening.

* * * * *